Oct. 29, 1957        A. H. HOFFER        2,811,685
ELECTRIC MOTOR CONTROL SYSTEM
Filed July 8, 1954
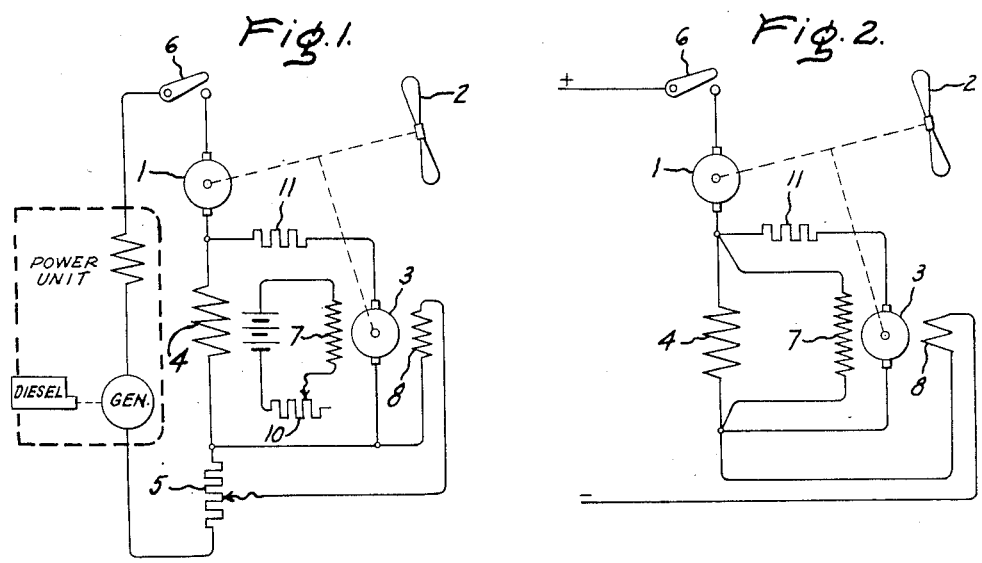
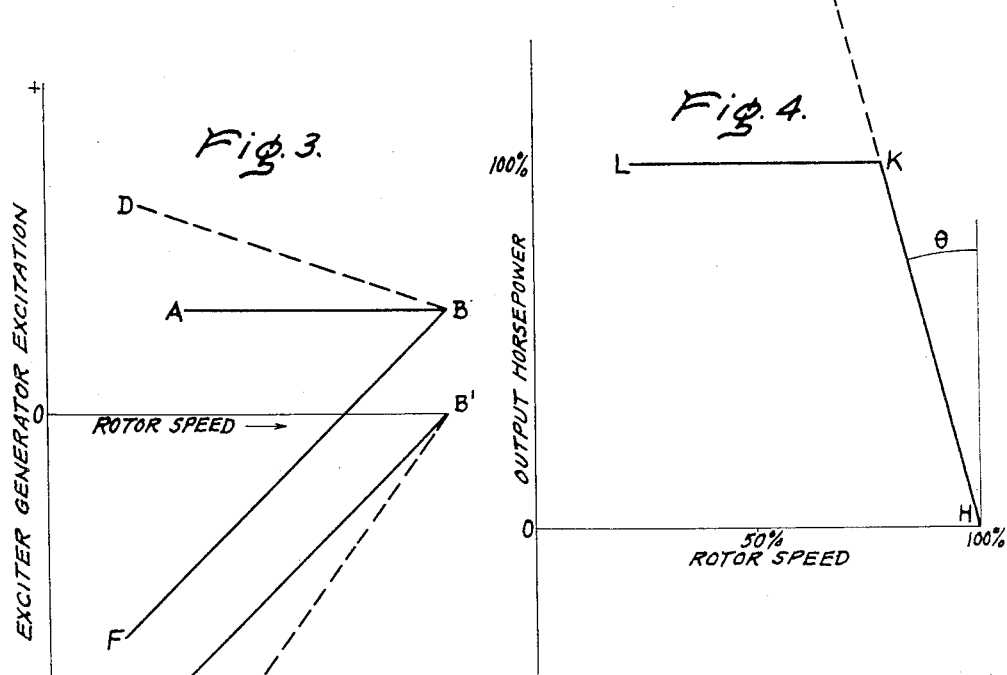
Inventor:
Arnold H. Hoffer,
by
His Attorney.

United States Patent Office 2,811,685
Patented Oct. 29, 1957

2,811,685

ELECTRIC MOTOR CONTROL SYSTEM

Arnold H. Hoffer, Erie, Pa., assignor to General Electric Company, a corporation of New York Application July 8, 1954, Serial No. 442,048

10 Claims. (Cl. 318—355)

This invention relates to electric motor control systems and more particularly to control systems for an electric motor connected to drive variable loads such as rotary snowplows used on railroads, steel rolling mills and the like.

In the past, many railroads have used steam-powered rotary snowplows. Conversion of the railroad industry from steam to diesel electric leaves the steam-powered snowplows without fuel, water, and proper maintenance facilities. A diesel powered electric motor driven snowplow is needed to fill the gap. When an electric drive is made up of standard series motors, the problem is presented of preventing overspeeds at light loads and stalling under heavy loads. The speed of response of the stabilizing control system must be rapid to compensate for the common occurrence of shock loads caused by avalanche or drift snow, which is more dense than new-fallen snow, hidden objects in the snow, etc. There is also the tendency for a sudden unloading of the snowplow where a portion of the track has been blown clean or has been kept clear by sheds. With the volume of snow and mass of the rotor being moved at high velocity it is important that the control be smooth over its entire range without sudden step functions or discontinuities.

It is, therefore, an object of my invention to provide a simple electric motor drive for a rotary snowplow that will meet these load conditions without stalling or running away.

It is a further object to provide a control for a motor drive that will operate the motor at the rated horsepower over a wide range of speeds.

Further objects and advantages of my invention will become apparent and the invention will be better understood by reference to the following description and the accompanying drawings. The features of novelty which characterize this invention will be pointed out with particularity in the claims annexed to and forming part of this specification.

In accordance with the preferred form of my invention as embodied in a diesel-powered electric motor drive for a snowplow, an exciter generator is connected to supply current to the series field winding of the driving motor so as to increase its excitation and thereby load the diesel prime mover to its rated output over the complete range of normal operating speeds of the plow rotor. In order that the system be speed responsive the exciter is mechanically connected to be driven by the motor, and the exciter current, since it is added to the motor series field current, tends to lower the no-load speed of the motor. A differential field winding on the exciter senses the load current in the motor to reduce the output of the exciter as the load increases. Thus, by simply adjusting the resistance of the exciter field winding circuit, the speed torque characteristics of the snowplow motor can be made to match the volt ampere characteristics of the diesel electric power unit.

This invention will be better understood by referring to the detailed specification taken in conjunction with the accompanying drawings in which:

Figure 1 is a schematic of a preferred form of this invention;

Figure 2 is a schematic of another embodiment of this invention;

Figure 3 is a graph showing the speed versus ampere-turns characteristics of the exciter generator; and Figure 4 is a graph showing the speed versus horsepower characteristics of the motor.

Referring to Figure 1 of the drawing, I have shown my invention in one form as applied to a diesel generator power unit for supplying power to a direct current series motor 1 connected to drive a snowplow rotor 2. A stabilizing auxiliary exciter generator 3 has its armature mechanically connected to be driven by the motor 1. The series field winding 4 of the motor 1, the voltage divider 5 and the armature 1 are serially connected across a direct current diesel driven generator through a switch 6.

Generally speaking, the speed of a direct current series motor is inversely proportional to the load current and to the field excitation. If the excitation were decreased as the load current increases, the system would tend to be constant speed for all loads so long as the supply voltage remained fixed. In accordance with my invention, I connect the armature of the exciter generator 3 in a loop circuit with the series field winding 4 to add a relatively large current of the same polarity as the motor current to the motor series field winding 4 at no-load and add less current as the load increases. To accomplish this, the exciter generator 3 has two field windings, a main shunt field winding 7 and a bucking or differential field winding 8. The main field winding 7 is wound to produce a current in the exciter generator 3 that aids the load current in the field winding 4 to prevent the motor 1 from running at excessive speeds under no-load conditions.

In order to produce a constant excitation in the main shunt field winding 7, this winding is serially connected through an adjustable rheostat 10 to a constant voltage source shown as a storage battery 9. Thus, the excitation of the field winding 7 may be varied to regulate the excitation and determine the no-load speed of the motor 1 and hence the rotor 2.

In order that the flux of the exciter generator 3 may be reduced as the load increases, the differential field winding 8 is connected magnetically to provide a field in opposition to the field produced by the winding 7 and is connected electrically to sense the load current by measuring the IR drop across an impedance shown as a voltage divider 5 which carries the motor load current. This resistor 5 although shown as a variable voltage divider, may be a fixed resistance or even omitted entirely with the field winding 8 connected in series with the motor 1 if the differential field winding 8 is wound to have the proper matching voltage ampere characteristics. This is only feasible where there is no requirement of impedance matching to regulate the full load speed for a particular power source.

In operation, switch 6 is closed to apply power to the snowplow motor 1. The voltage of the power supply generator is then increased to the rated output by the usual field controller (not shown). To provide adequate starting current in the field winding 4, the resistor 11 limits the current in the exciter generator branch of the loop circuit.

When the motor 1 is not loaded, it will get up to rated speed within a short time after full voltage is applied. The output current of the armature of the exciter generator 3 increases the current in the motor field winding 4. To insure the speed sensitivity of the system, the stabilizing exciter generator 3 is mechanically connected to be driven by the motor 1. Any increase in speed of the motor 1 will produce an increase in the current output of the exciter generator 3 which increases the current in the field winding 4 thereby tending to limit the speed of the motor 1.

Under no-load conditions the differential field winding 8 carries a very small current and has little effect on the flux in the exciter generator 3. During the operation of the snowplow, as the load current through voltage divider 5 increases, the current through the differential field winding 8 increases proportionally and thereby reduces the flux in the exciter generator 3 and the output current of the exciter generator. The resulting reduction of the circulating current in the exciter branch tends to decrease the field current of the snowplow motor 1.

Under normal loads, this controlled flux in the snowplow motor substantially overcomes the extreme falling off of speed caused by the reduction of voltage that occurs when the diesel generator source is loaded by the motor 1 as well as the natural tendency of the snowplow D. C. series motor 1 to slow down when loaded. Without this control the motor might slow down to such a degree that the snow would no longer be thrown clear of the plow shoot. This of course will stall the motor 1.

When the horsepower load on the plow rotor 2 is increased beyond the rating of the diesel power unit, the speed of the rotor 2 will fall and the kinetic energy of the moving parts will be utilized. This provides a tremendous source of energy to overcome shock loads, which tend to stall the rotor instantaneously.

The control system of this invention will cause the motor 1 to load the diesel power unit to its maximum horsepower over a very wide range of rotor speeds (see Fig. 4). This is made possible by holding the motor field current substantially constant as shown by DB of Fig. 3. Thus, under full load conditions the distance the snow is thrown will vary inversely as the amount of the snow thrown. It is easily seen that at full horsepower the amount of snow thrown multiplied by the distance it is thrown is constant since the horsepower is limited by the prime mover capacity. In fact, once the motor 1 is at rated load of the power supply, the distance the snow is thrown may be regulated by controlling the speed of the locomotive which pushes the diesel power unit and the plow unit.

In Figure 2 I have shown a simplified control where the motor 1, the field winding 4, and the differential field winding 8 are serially connected across the power supply. The main shunt field winding 7 and the armature of the exciter generator 3 are connected in parallel across the field winding 4. Thus, the exciter generator forms a loop circuit with both of these field windings with the resistor 11 in series with the exciter generator 3 to protect the exciter generator during starting and to regulate the no-load speed of the motor 1. The resistor 11 may be fixed when the diesel generator power unit for supplying power to this plow unit is matched to the system shown. However, if the resistor is omitted, there is the danger that the armature of the exciter generator 3 will shunt the field windings 4 and 7 and the system will run away.

In Figure 2, the differential field winding 8 will necessarily be of fewer turns than that of Figure 1 where the effect of the differential field 8 may be reduced by adjusting the voltage tap of voltage divider 5.

Figure 3 is a curve of the exciter generator ampere turns on the ordinate scale versus the speed of the motor on the abscissa scale. The maximum no-load speed of the motor is shown at B'. The shunt field excitation of Figure 1 is shown by line AB. The differential excitation is shown by line CB'. The Figure 2 shunt field excitation, although found to be relatively constant because of the decrease in exciter current, varies as the current through the field winding 4 changes and is shown in Figure 3 as dotted line DB. To compensate for this variation, the excitation by the field winding 8 in Fig. 2 is increased somewhat to follow the dotted line EB'. The net excitation of the exciter generator 3 is shown by line FB, regardless of whether the field windings are connected as shown in Figure 1 or Figure 2.

Referring again to the control system shown in Figure 1, the adjustment of the main shunt field winding 7 excitation regulates the no-load flux of the exciter generator 3 and regulates the maximum no-load speed as shown at H of Figure 4. The setting of the voltage divider 5 controls the excitation of the differential field winding 8 and the angle $\theta$. This angle represents the rate of reduction in speed as the load is increased. Thus without any horsepower limit I am able to get the speed-horsepower characteristic HKM shown in Figure 4. Such a characteristic is very useful when working with a load of heavy inertia, such as in a steel rolling mill. Of course the steel mill use does not have the horsepower limit of the snowplow which is generally energized from an ambulatory source such as a diesel engine. The horsepower limit is shown in Figure 4 as line LK.

In summary, the exciter generator 3 of both Figs. 1 and 2 yields the maximum current output at full speed no-load. This prevents runaway of the motor. As the load builds up, the load current through the motor field winding 4 tends to increase and the speed tends to drop. However, the differential field winding 8 reduces the output of the exciter generator 3 so that the flux produced by the field winding 4 is somewhat reduced tending to hold the speed of the motor 1 constant.

It should be noted that the system is reversible. Should the rotor become jammed, the motor armature connections can be reversed with respect to the rest of the system to back the rotor from the piece of material that is trapped. In fact this system is equally applicable to series A. C. motors which are often operated like D. C. motors.

While I have shown particular embodiments of my invention, it should be understood, of course, that many modifications may be made. Therefore, I contemplate by the appended claims to cover any such modifications as fall within the true spirit and scope of this invention.

What I claim as new and desire to secure by Letters Patent of the United States is:

1. A control system for a motor having an armature and a series field connected to be supplied from a source of power having a maximum horsepower output, comprising an exciter generator having its armature mechanically connected to be driven by the motor thereby responding to changes in motor speed and electrically connected across the series field winding of the motor for increasing the current through said winding, a shunt field winding for furnishing relatively constant excitation to said exciter generator, and a differential field winding for said exciter generator connected to reduce the effect of said shunt field winding, said differential field winding being connected in series relation with said motor to sense the load current of said motor and thereby decrease the current supplied by the exciter generator to the series motor field winding with an increase in motor current.

2. A control system for a snowplow motor comprising a motor having a series field winding, a voltage divider, said motor and said voltage divider being serially connected across a diesel electric source of power, an auxiliary exciter generator having its armature mechanically connected to said motor and electrically connected across said series field winding to supply current to said field winding when said motor is driven without load, an impedance connected in series with said generator to limit the current of said generator when the power is first applied across the motor, a shunt field winding for furnishing relatively constant excitation to said exciter generator, and a differential field winding connected across a portion of said voltage divider to limit the excitation of said exciter generator in response to load current in said motor and thereby decrease the current supplied by said exciter generator to said series field winding.

3. A control system for a motor provided with a series field winding comprising an exciter generator having its armature mechanically connected to be driven by the motor, electric circuit means for connecting said exciter generator armature across the series field winding of the motor to increase the current in the winding, a first excitation winding for said exciter generator, means for energizing said excitation winding with a substantially constant energization, a second excitation winding for said exciter generator for providing a magnetic field in opposition to the magnetic field of said first excitation winding, and means for exciting said second excitation winding in proportion to the load current in said motor to decrease the excitation of said exciter generator when the load current in the motor increases.

4. A control system for a motor provided with a series field winding and powered by a limited horsepower supply comprising an exciter generator having its armature mechanically connected to be driven by the motor, electric circuit means for connecting said exciter generator armature across the series field winding of the motor to increase the current in said series field winding when the generator is driven by said motor, a first excitation winding for said exciter generator, means for supplying a substantially constant current to said first excitation winding, a second excitation winding for said exciter generator connected to provide a magnetic field in opposition to the magnetic field of said first excitation winding, connections for connecting said second excitation winding in circuit with the motor to decrease the excitation of said exciter generator when the load current in the motor increases and thereby decrease the current from the exciter generator to the motor series field winding proportional to the increase in load current.

5. A control system for a series motor powered from a diesel generator source comprising an exciter generator with its armature mechanically connected to be driven by the motor, electric circuit means for connecting said exciter generator armature to increase the current in the series field winding of the motor, a first excitation winding for said exciter generator connected to a constant voltage source to furnish a constant flux, a second excitation winding arranged to reduce the flux in said exciter generator, and means for exciting said second excitation winding in proportion to the load current of the motor.

6. In combination, a motor having a series field winding, an exciter generator mechanically connected to be driven by said motor and electrically connected across the series field winding to supply current of the same polarity as the motor current thereto, a shunt field winding for said exciter generator for furnishing relatively constant excitation, a differential field winding connected for bucking said shunt field winding, and means connecting said differential field winding in circuit with the motor to carry current proportional to the load current in said motor whereby the current in the series field winding supplied by the exciter generator is proportionately decreased with an increase in load current.

7. In combination, a diesel electric source of D. C. power, a D. C. motor having a series field winding and an armature connected across said source, an exciter generator having an armature mechanically connected to be driven by said motor armature and electrically connected in parallel relation with said series field winding to increase the current of said series field winding when said motor is motoring without load, a shunt field winding for said generator for furnishing relatively constant excitation connected across a source of constant voltage, a differential field winding for reducing the excitation caused by said shunt field winding, and means connecting said differential field to carry current proportional to the load current in said armature whereby the current in the series field winding supplied by said exciter generator is proportionately decreased with an increase in load current in said motor armature.

8. In combination, a motor having an armature and a series field winding, an exciter generator having its armature mechanically connected to be driven by said motor and electrically connected in series with said motor armature and across said windings to form a loop circuit with said series field winding, said exciter generator being arranged to supply current to said series field winding to increase the excitation thereof, a resistor connected in said loop circuit and in series relation with said armature of said exciter generator to limit the current through said exciter generator to provide sufficient current in said series field winding to excite said motor when said motor is initially energized, a first excitation winding for said exciter generator connected across said series field winding of said motor armature, a second excitation winding for said exciter generator for providing a magnetic field in opposition to the magnetic field of said first excitation winding, said second excitation winding being connected electrically in series with said motor armature.

9. In combination, a motor having an armature and a series field winding, an exciter generator having its armature mechanically connected to be driven by said motor and electrically connected to supply current to said series field winding, a resistor connected in series relation with said armature of said exciter generator to limit the current through said exciter generator when said motor is initially energized, a first excitation winding for said exciter generator connected across said armature of said exciter generator, a second excitation winding for said exciter generator for providing a magnetic field in opposition to the magnetic field of said first excitation winding, said second excitation winding being connected electrically in series with said motor armature.

10. In combination, a motor having a series field winding, an exciter generator having its armature mechanically connected to be driven by said motor and electrically connected to supply current to said series field winding, a resistor connected electrically between said motor and said armature of said exciter generator to limit the current through said exciter generator when said motor is initially energized, a shunt field winding for said exciter generator connected across said armature of said exciter generator, a differential field winding for said exciter generator arranged to provide a magnetic field in opposition to the magnetic field of said shunt field winding, said differential field winding being connected electrically in circuit with said motor to be energized in proportion to the motor current.

References Cited in the file of this patent

UNITED STATES PATENTS

| | | |
|---|---|---|
| 1,413,091 | Axtell | Apr. 18, 1922 |
| 1,513,242 | Hellmund | Oct. 28, 1924 |
| 1,584,608 | Butler | May 11, 1926 |
| 1,698,288 | Winne | Jan. 8, 1929 |